US009772087B2

(12) United States Patent
Marfeld et al.

(10) Patent No.: US 9,772,087 B2
(45) Date of Patent: Sep. 26, 2017

(54) LIGHTING DEVICE WITH OPTICAL ELEMENT IN THE FORM OF A SOLID BODY

(75) Inventors: Jan Marfeld, Regensburg (DE); Ulrich Streppel, Regensburg (DE); Julius Muschaweck, Gauting (DE)

(73) Assignee: OSRAM Opto Semiconductors GmbH (DE)

( * ) Notice: Subject to any disclaimer, the term of this patent is extended or adjusted under 35 U.S.C. 154(b) by 790 days.

(21) Appl. No.: 13/147,018

(22) PCT Filed: Feb. 4, 2010

(86) PCT No.: PCT/EP2010/051375
§ 371 (c)(1),
(2), (4) Date: Sep. 14, 2011

(87) PCT Pub. No.: WO2010/091998
PCT Pub. Date: Aug. 19, 2010

(65) Prior Publication Data
US 2011/0317414 A1 Dec. 29, 2011

(30) Foreign Application Priority Data

Feb. 11, 2009 (DE) .......... 10 2009 008 368
Apr. 16, 2009 (DE) .......... 10 2009 017 495

(51) Int. Cl.
*F21V 8/00* (2006.01)
*F21V 7/00* (2006.01)
(Continued)

(52) U.S. Cl.
CPC .............. *F21V 7/0091* (2013.01); *F21V 5/04* (2013.01); *F21V 5/045* (2013.01);
(Continued)

(58) Field of Classification Search
CPC .... F21V 5/04; F21V 7/0091; F21Y 2113/005; F21Y 2101/02; G02B 19/0066
(Continued)

(56) References Cited

U.S. PATENT DOCUMENTS 2,254,961 A    9/1941  Harris
4,992,704 A *  2/1991  Stinson .......................... 315/312
(Continued)

FOREIGN PATENT DOCUMENTS

CA    2 620 144    10/2006
CN    1797802      7/2006
(Continued)

OTHER PUBLICATIONS

English Translation of an Office Action from corresponding Chinese Application No. 201080007516.9 dated Jun. 30, 2014.

*Primary Examiner* — Robert May
(74) *Attorney, Agent, or Firm* — DLA Piper LLP (US)

(57) ABSTRACT

A lighting device includes a light source including at least two light-emitting diode chips which emit light of mutually differing colors when in operation, and an optical element in the form of a solid body made from a dielectric material including a radiation entrance face facing towards the light-emitting diode chips, a radiation exit face remote from the light-emitting diode chips, and a circumferential face connecting the radiation entrance face and the radiation exit face to one another, wherein the circumferential face is reflective to the light emitted by the light-emitting diode chips when in operation, and the radiation entrance face and/or the radiation exit face is/are non-planar at least in places, wherein a gap, which is filled with a gas, is arranged between at least one of the light-emitting diode chips of the light source and the radiation entrance face, and the optical element is a sole optical element of the lighting device, (Continued)

which optical element is arranged downstream of all light-emitting diode chips of the light source.

17 Claims, 7 Drawing Sheets

(51) Int. Cl.
| | |
|---|---|
| *F21V 5/04* | (2006.01) |
| *G02B 19/00* | (2006.01) |
| *F21V 9/08* | (2006.01) |
| *F21Y 105/10* | (2016.01) |
| *F21Y 115/10* | (2016.01) |
| *F21Y 113/13* | (2016.01) |

(52) U.S. Cl.
CPC ..... *G02B 19/0028* (2013.01); *G02B 19/0066* (2013.01); *F21V 9/08* (2013.01); *F21Y 2105/10* (2016.08); *F21Y 2113/13* (2016.08); *F21Y 2115/10* (2016.08)

(58) Field of Classification Search
USPC ............ 362/311.02, 311.06–311.12, 311.15, 362/326–327, 333–338; 359/726–727
See application file for complete search history.

(56) References Cited

U.S. PATENT DOCUMENTS

| | | | |
|---|---|---|---|
| 6,536,923 B1 * | 3/2003 | Merz | ............................ 362/327 |
| 6,547,423 B2 | 4/2003 | Marshall et al. | |
| 6,724,543 B1 * | 4/2004 | Chinniah et al. | ............. 359/718 |
| 7,843,654 B2 * | 11/2010 | Destain | ........................ 359/794 |
| 2005/0006658 A1 | 1/2005 | Ho | |
| 2006/0083023 A1 | 4/2006 | Ayabe et al. | |
| 2006/0091784 A1 | 5/2006 | Conner et al. | |
| 2007/0085103 A1 | 4/2007 | Nishioka et al. | |
| 2007/0279904 A1 | 12/2007 | Tasch et al. | |
| 2008/0068852 A1 | 3/2008 | Goihl | |
| 2008/0239717 A1 * | 10/2008 | Chen et al. | .................... 362/231 |
| 2008/0277679 A1 * | 11/2008 | Akimoto | ......................... 257/94 |
| 2008/0310159 A1 | 12/2008 | Chinniah et al. | |
| 2009/0296407 A1 * | 12/2009 | Bailey | .......................... 362/309 |
| 2010/0200878 A1 | 8/2010 | Finger | |

FOREIGN PATENT DOCUMENTS

| | | |
|---|---|---|
| CN | 1886841 | 12/2006 |
| CN | 1965417 | 5/2007 |
| CN | 101194371 | 6/2008 |
| CN | 101527982 A | 9/2009 |
| DE | 10 2006 043 402 A1 | 3/2008 |
| EP | 1 650 588 | 4/2006 |
| GB | 2 372 091 A | 8/2002 |
| WO | 2006/105646 A1 | 10/2006 |
| WO | 2008/152576 A1 | 12/2008 |

* cited by examiner

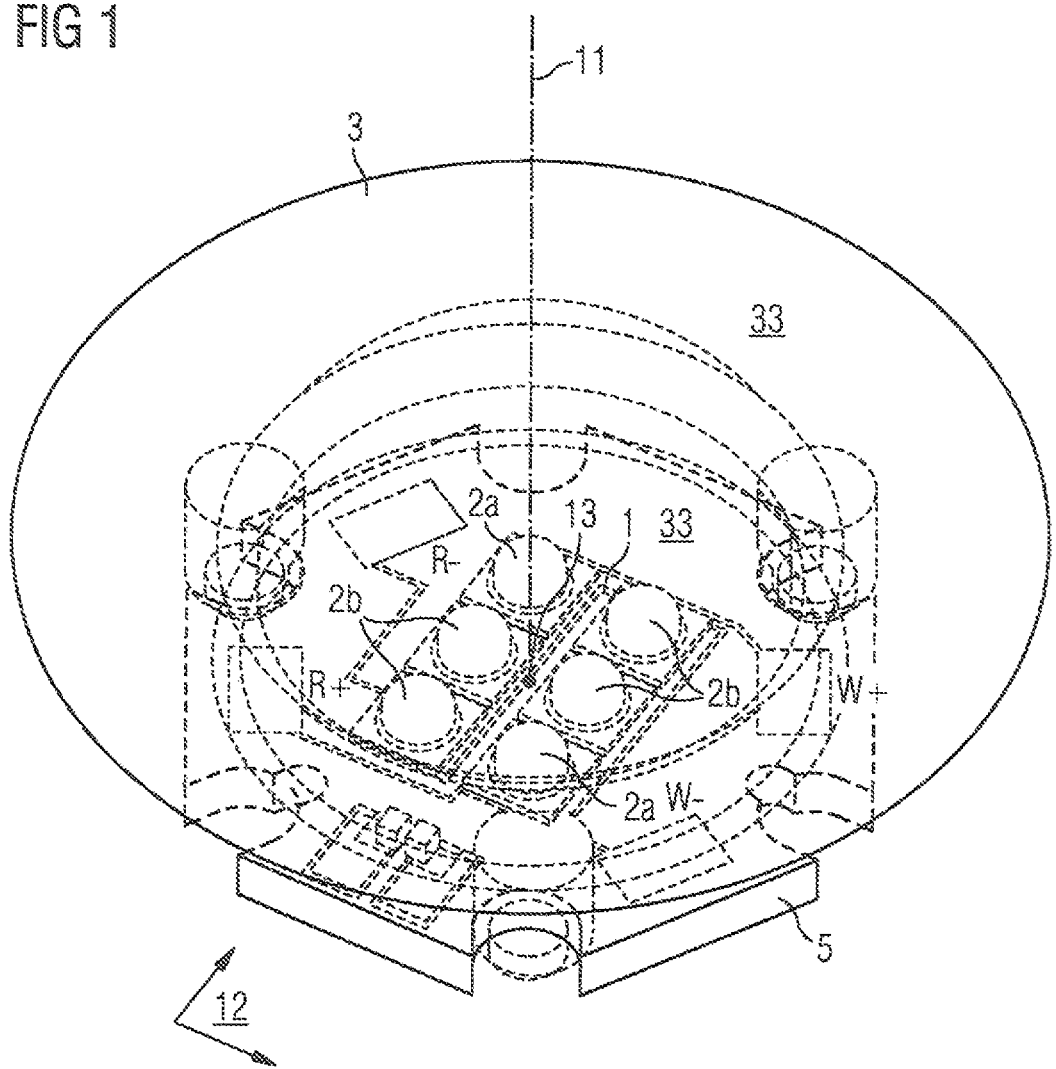

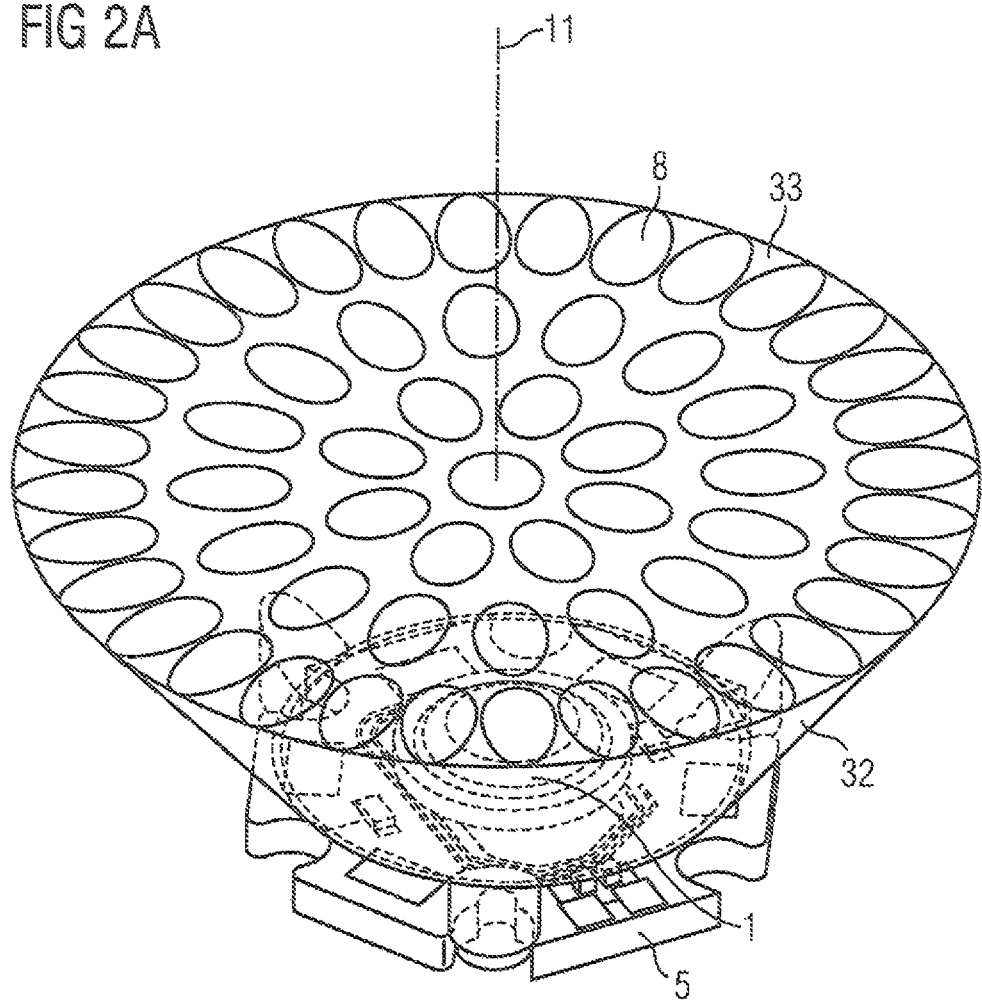

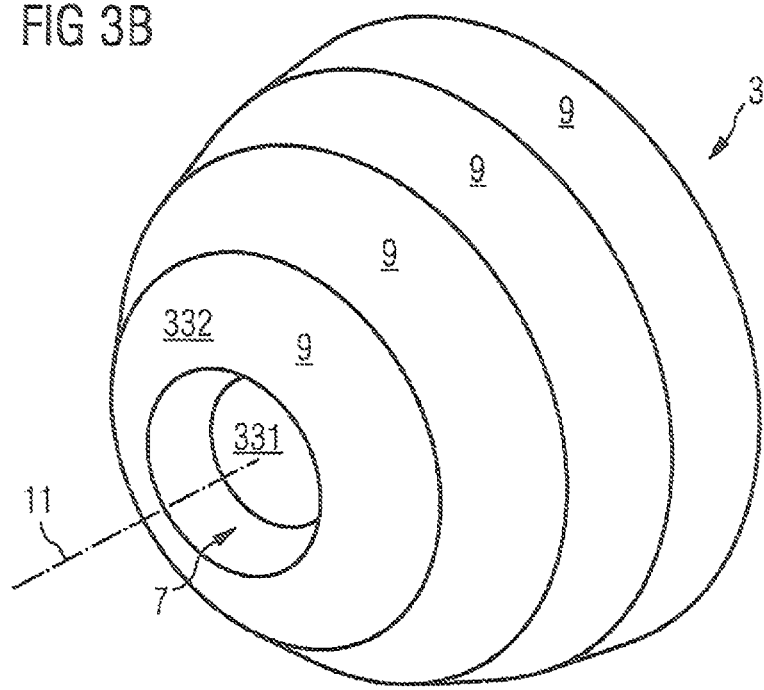
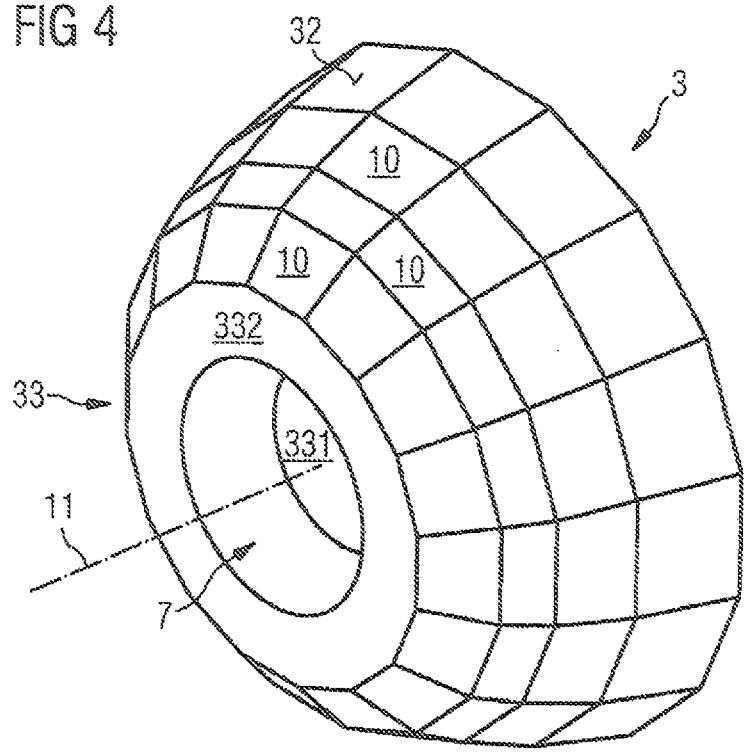

LIGHTING DEVICE WITH OPTICAL ELEMENT IN THE FORM OF A SOLID BODY

RELATED APPLICATIONS

This is a §371 of International Application No. PCT/EP2010/051375, with an international filing date of Feb. 4, 2010 (WO 2010/091998 A1, published Aug. 1, 2010), which is based on German Patent Application Nos. 10 2009 008 368.5, filed Feb. 11, 2009, and 10 2009 017 495.8, filed Apr. 16, 2009, the subject matter of which is incorporated by reference.

TECHNICAL FIELD

This disclosure relates to a lighting device capable of producing polychromatic light particularly uniformly and with defined emission characteristics.

SUMMARY

We provide a light device including a light source including at least two light-emitting diode chips which emit light of mutually differing colors when in operation, and an optical element in the form of a solid body made from a dielectric material including a radiation entrance face facing towards the light-emitting diode chips, a radiation exit face remote from the light-emitting diode chips, and a circumferential face connecting the radiation entrance face and the radiation exit face to one another, wherein the circumferential face is reflective to the light emitted by the light-emitting diode chips when in operation, and the radiation entrance face and/or the radiation exit face is/are non-planar at least in places, wherein a gap, which is filled with a gas, is arranged between at least one of the light-emitting diode chips of the light source and the radiation entrance face, and the optical element is a sole optical element of the lighting device, which optical element is arranged downstream of all light-emitting diode chips of the light source.

We also provide a lighting device including a light source including at least two light-emitting diode chips which emit light of mutually differing colors when in operation, and an optical element in the form of a solid body made from a dielectric material including a radiation entrance face facing the light-emitting diode chips, a radiation exit face remote from the light-emitting diode chips, and a circumferential face connecting the radiation entrance face and the radiation exit face to one another, wherein the circumferential face is reflective to the light emitted by the light-emitting diode chips when in operation, and the radiation entrance face and/or the radiation exit face is/are non-planar at least in places, wherein the optical element includes an indentation on the radiation exit face side, the optical element includes in the indentation a convexly outwardly curved first zone laterally surrounded at least in places by a second zone of the optical element, and the circumferential face is composed at least in places of the circumferential faces of at least two truncated cones which differ with regard to their opening angle or the circumferential face is composed at least in places of planar faces which at least approximate to a truncated cone.

We further provide a lighting device including a light source including at least two light-emitting diode chips which emit light of mutually differing colors when in operation, and an optical element in the form of a solid body made from a dielectric material including a radiation entrance face facing the light-emitting diode chips, a radiation exit face remote from the light-emitting diode chips, and a circumferential face connecting the radiation entrance face and the radiation exit face to one another, wherein the circumferential face is reflective to the light emitted by the light-emitting diode chips when in operation, and the radiation entrance face and/or the radiation exit face is/are non-planar at least in places, wherein when the light source is in operation, non-uniformities in color location perceptible to a human observer are present on the radiation exit face of the optical element, and in the far field the color location of an area illuminated with the light from the lighting device appears uniform to an observer.

BRIEF DESCRIPTION OF THE DRAWINGS

FIGS. 1A, 1B, 2A, 2B, 3A, 3B and 4 show examples of lighting devices described herein and the associated optical elements with reference to schematic diagrams.

DETAILED DESCRIPTION

Figure 1B:
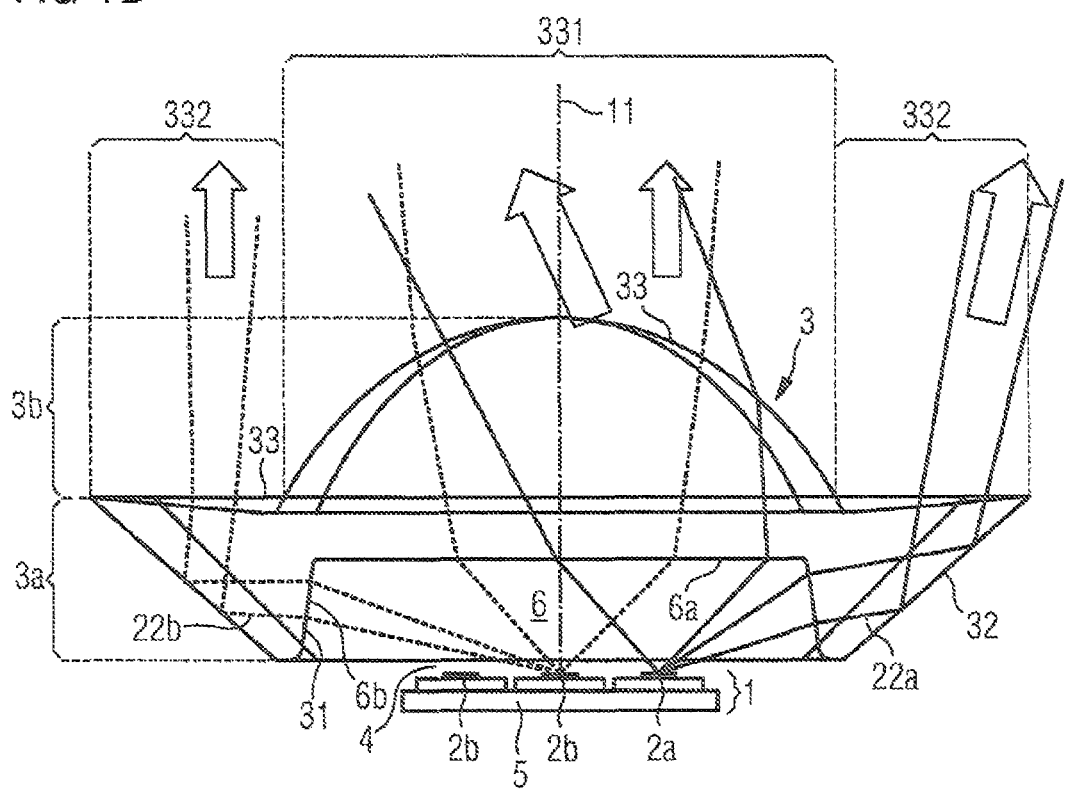

The lighting device may comprise a light source. The light source may comprise at least two light-emitting diode chips which emit light of mutually differing colors when in operation. For example, at least one of the light-emitting diode chips may emit red light when in operation. Another light-emitting diode chip of the light source may then, for example, emit white light when in operation. It is furthermore possible for the light source to comprise more than two light-emitting diode chips, wherein the light-emitting diode chips emit light of three or more different colors when in operation.

The lighting device may comprise an optical element. The optical element may be provided for concentrating the light produced by the light source into a light beam with a defined emission profile. For example, the optical element may concentrate the light produced by the light source when in operation into a light cone with an opening angle of between at least 5° and at most 40°. The opening angle of the light cone is the angle between the cone envelope line and the axis of the cone. The envelope of the light cone is assumed to be located where the intensity of the emitted light has declined to half its maximum value.

The optical element is furthermore provided for mixing the light of different colors from the light-emitting diode chips of the light source. The optical element mixes the light such that the resultant color location of the light emitted from the lighting device in the far field at least falls within the coordinates of the ANSI boxes of the correlated color temperature of mixed light. "In the far field" means that the distance from a radiation exit face of the lighting device amounts, for example, to ten times or more the diameter of the optical element (e.g., 1 m or more). The optical element is preferably provided to ensure that the defined color location of the mixed light is established over the entire angle around the lighting device. This means that the described defined color location of the mixed light is established over an angular range of 180° on an imaginary hemisphere which completely spans the lighting device in the manner of a dome.

In other words, the optical element is provided to mix the differently colored light emitted by the light-emitting diode chips in such a manner that the color location of an area illuminated with the lighting device appears uniform to the human eye.

The optical element may take the form of a solid body which consists of a dielectric material. For example, the optical element consists of a plastics material, such as, for example, PMMA. This has the advantage that the optical element may be manufactured particularly cost-effectively, for example, by an injection molding process.

The optical element may comprise the following faces: a radiation entrance face which faces towards the light-emitting diode chips, a radiation exit face which is remote from the light-emitting diode chips, and a circumferential face which connects the radiation entrance face and the radiation exit face to one another.

In other words, the optical element is arranged with its radiation entrance face downstream of the light-emitting diode chips in their main direction of emission such that the predominant part of the light emitted by the light-emitting diode chips when in operation reaches the radiation entrance face of the optical element from where it may enter the optical element. A major part of the light coupled into the optical element leaves the optical element through the radiation exit face which is arranged on the side of the optical element remote from the radiation entrance face. The circumferential face of the optical element surrounds the optical element laterally and, in this manner, connects the radiation entrance face to the radiation exit face.

The circumferential face may be reflective to the light emitted by the light-emitting diode chips when in operation. This means that light which impinges on the circumferential face as it passes through the optical element is at least predominantly reflected there, for example, in the direction of the radiation exit face. Reflection may proceed by total reflection. The circumferential face may, however, also have a reflective coating. The reflective coating may be provided, for example, by a metal layer which is, for example, vapor-deposited onto the circumferential face.

The radiation entrance face and/or the radiation exit face of the optical element may be non-planar at least in places. "Non-planar" may mean that at least one of these faces is convexly or concavely curved. Non-planar may furthermore mean that at least one of these faces comprises patterning, such as, for example, a roughened portion. The face which is non-planar at least in places may also be of planar and/or smooth construction in some zones. In these zones, the face exhibits no curvature and/or no patterning.

A gap, which is filled with a gas, may be arranged between at least one of the light-emitting diode chips of the light source and the radiation entrance face. The gap may, for example, be filled with air. This means that light emitted by the light-emitting diode chips when in operation is refracted at the radiation entrance face on entering the optical element since a large refractive index difference is present there. The refractive index of the gas amounts, for example, to around n=1. The refractive index of the optical element amounts to at least 1.3. In other words, the radiation entrance face acts as an optical face. At least one of the light-emitting diode chips is not connected to the optical element in a refractive index-adapted manner. It is possible for the gap to be located between all the light-emitting diode chips of the light source and the radiation entrance face of the optical element.

The optical element of the lighting device may be the sole optical element which is arranged downstream of all the light-emitting diode chips of the light source. This means that in this case the lighting device comprises a single optical element which is provided to produce a defined emission profile and for color mixing. Using a single optical element for both of these tasks minimizes optical interface losses and provides the advantage of a particularly efficient lighting device. A multistage optical system is thus not used, in which in a first stage the light is, for example, pre-collimated, in a second stage the emission profile is adjusted in defined manner and in a final stage, for example, by a light diffusion element, color mixing is effected.

The lighting device may comprise a light source which comprises at least two light-emitting diode chips which emit light of mutually differing colors when in operation, and an optical element which takes the form of a solid body of a dielectric material. The optical element here comprises a radiation entrance face which faces towards the light-emitting diode chips, a radiation exit face which is remote from the light-emitting diode chips, and a circumferential face which connects the radiation entrance face and the radiation exit face to one another, wherein the circumferential face is reflective to the light emitted by the light-emitting diode chips when in operation and the radiation entrance face and/or the radiation exit face is/are non-planar at least in places. A gap, which is filled with a gas, is arranged between at least one of the light-emitting diode chips of the light source and the radiation entrance face. The optical element is the sole optical element which is arranged downstream of all the diode chips of the lighting device. The lighting device emits mixed light which is uniform in the far field.

The lighting device described herein is based inter alia on the following ideas: on the one hand, using just one single-stage optical system for color mixing and producing a defined emission profile proves particularly efficient because losses at the interfaces of the optical element are minimized as a consequence. To this end, a dedicated light path is provided in the optical element for each color of the light-emitting diode chips, each of which paths taken alone would illuminate an area in the far field non-uniformly, at least with regard to color. The non-uniformities of the individual light paths offset one another overall, whereby light mixing is achieved. This means that non-uniformities in color location which are perceptible to a human observer may be present on the radiation exit face of the optical element. In the far field, however, the color location of the area illuminated with the lighting device appears uniform.

The circumferential face of the optical element may be at least in places the circumferential face of a truncated cone. This means that, between the radiation entrance face and the radiation exit face, the optical element comprises at least one zone in which it is in the shape of a truncated cone. The truncated cone preferably tapers from the radiation exit face towards the radiation entrance face. It is overall also possible for the projection of the radiation exit face to have a larger area in a plane perpendicular to a longitudinal center axis of the optical element than the projection of the radiation entrance face in this plane.

The light from the light-emitting diode chips may be reflected by total reflection at the circumferential face in the direction of the radiation exit face. The means that light is guided in the optical element from the radiation entrance face to the radiation exit face by total reflection at the circumferential face. Beams of light from the light-emitting diode chips pass through the solid body of the optical element and, at the circumferential face, encounter a jump in refractive index from the optically denser material of the optical element to the optically rarer material of the surroundings, for example, air. Light guidance by total reflection proves particularly efficient and results in there being virtually no optical losses due to reflection or none at all.

Each beam of the light emitted by the light-emitting diode chips may be reflected at most once at the circumferential face before it leaves the optical element through the radiation exit face. This means that a light beam passes through the optical element either without impinging on the circumferential face or the light beam impinges on the circumferential face at most once, where it may then, for example, be totally reflected in the direction of the radiation exit face of the optical element. This may be achieved by appropriate adjustment of the height of the optical element in the zone of the circumferential face in a direction along the longitudinal center axis of the optical element in relation to the light-emitting face of the light source. This means, for example, that the optical element is made thinner in the zone of the circumferential face, the larger is the light-emitting face of the light source. The light-emitting face is the face which includes the envelope curve which is guided around all the light-emitting diode chips of the light source.

The optical element may take the form of a truncated cone in places. In the zone in which the optical element takes the form of a truncated cone, it comprises a circumferential face which is the circumferential face of a truncated cone. The optical element may comprise one, two, three or more truncated cones, wherein the plurality of truncated cones are stacked one on top of another. The truncated cone or cones taper from the radiation exit face towards the radiation entrance face of the optical element.

The optical element may take the form of a truncated cone in places, which truncated cone comprises a recess on the radiation entrance face side. On the radiation entrance face side, the truncated cone may, for example, comprise a hole which is shaped in predetermined manner. The recess is preferably rotationally symmetrical relative to the longitudinal center axis of the optical element. The recess is, for example, cylindrical in shape, wherein the longitudinal center axis of the cylinder coincides with the longitudinal center axis of the truncated cone and with the longitudinal center axis of the optical element.

The recess may be provided so that beams of light which impinge on the bottom face of the recess facing towards the light-emitting diode chips can pass through the optical element without impinging on the circumferential face of the optical element. Side faces of the recess, which laterally enclose the bottom face of the recess, may be provided to guide beams of light which impinge by refraction on the circumferential face, where they are reflected by total reflection in the direction of the radiation exit face. All in all, the radiation entrance face provided with a recess serves to form the beam. The bottom face of the recess may to this end be structures or patterned in places, for example, it may be convexly or concavely curved or comprise roughened portions. The side face of the recess is preferably of smooth construction and is thus not roughened.

The optical element may comprise an indentation on the radiation exit face side, wherein the optical element comprises in the indentation a convexly outwardly curved first zone. The first zone is preferably arranged rotationally symmetrically around the longitudinal center axis of the optical element. In this zone, the optical element may, for example, take the form of a convergent lens. The optical element then preferably comprises a second zone which laterally surrounds the first zone. The second zone, for example, encloses the first zone in annular manner.

The second zone may project at least in places beyond the first zone in the direction from the radiation entrance face to the radiation exit face. This means that the second zone may take the form of a kind of wall in the manner of a frame around the first zone. The second zone may completely enclose the first zone. The optical element then, for example, comprises an indentation on its radiation exit face in which indentation is formed a zone which is curved convexly outwards, i.e., in the direction away from the radiation entrance face to the radiation exit face. The second zone then projects at the sides beyond the convexly curved zone.

At least one of the following faces of the optical element may comprise patterning at least in places: the radiation entrance face, the radiation exit face, the circumferential face. The patterning may, for example, comprise lenticular convex or concave patterning formed in the respective face. For example, elliptical lenses are arranged on the radiation exit face, which lenses are formed on the radiation exit face by convexly outwardly curved zones of the optical element. The elliptical lenses may then be oriented with their main direction of extension in the direction of the point of intersection of the longitudinal center axis and radiation exit face.

The patterning may furthermore comprise a roughened portion which is provided for light diffusion. The roughened portion may be provided for further intermixing of the different colors of the light-emitting diode chips. It is, however, then important for at least parts of the radiation entrance face to be free of such roughened portions. This means that the radiation entrance face may be of smooth construction in places. In particular, the radiation entrance face is of smooth construction where beams of light enter it and, in their further course, impinge on the circumferential face where they are totally reflected. These beams of light are in fact guided in defined manner by the optical element such that overall a mixed light of uniform color which has a defined emission profile is obtained.

The circumferential face may be composed at least in places of the circumferential faces of at least two, in particular at least three, truncated cones which differ with regard to their opening angle. The opening angles of the truncated cones are the angles between an envelope line of the truncated cone and the cone axis. The cone axis of the truncated cones preferably coincides with the longitudinal center axis of the optical element. The cones are arranged on one another such that they in each case taper in the direction from the radiation exit face to the radiation entrance face of the optical element.

The optical element may thus comprise a circumferential face composed of the circumferential faces of at least two or more truncated cones. The at least two or more truncated cones approximate to the circumferential face of a larger truncated cone. In other words, the optical element comprises rotationally symmetrical facets on its outer face which are rotationally symmetrical with regard to the longitudinal center axis of the optical element. This facetting of the circumferential face of the optical element results in the emerging light being mixed particularly uniformly with regard to its color.

The circumferential face is composed at least in places of planar faces which at least approximate to a truncated cone. This means that the circumferential face is, for example, completely composed of non-rotationally symmetrical facets. This measure also results in the light emerging from the lighting device being particularly uniformly mixed.

The light-emitting diode chips of the light source may be arranged in a common mounting plane. The common mounting plane comprises, for example, the surface of a connection carrier on which the light-emitting diode chips are accommodated. The optical element is rotationally symmetrical with regard to the longitudinal center axis. Identically colored light-emitting diode chips of the light source are point-symmetrical with regard to the point of intersection between the longitudinal center axis and the mounting plane. Such an arrangement of the light-emitting diode chips of the light source with regard to the optical element enables particularly uniform mixing of the light emitted by the lighting device.

The phrases "rotationally symmetrical" and "point-symmetrical" should be taken to mean that such symmetry is maintained in terms of manufacturing tolerance. There is thus no apparent and deliberate deviation from such symmetries.

The lighting device described is explained in greater detail below with reference to examples and the associated figures.

Identical, similar or identically acting elements are provided with the same reference numerals in the Figures. The Figures and the size ratios of the elements illustrated in the Figures relative to one another are not to be regarded as being to scale. Rather, individual elements may be illustrated on an exaggeratedly large scale for greater ease of depiction and/or better comprehension.

FIGS. 1A and 1B show a first example of a lighting device described herein in schematic perspective representations from different viewing angles. The lighting device comprises a light source 1. The light source 1 comprises six light-emitting diode chips 2a, 2b. For example, the light source 1 comprises two light-emitting diode chips 2a which emit red light and four light-emitting diode chips 2b which emit white light.

The white light of the light-emitting diode chips 2b is, for example, produced by a luminescence conversion material which converts at least some of the light emitted by a semiconductor body of the light-emitting diode chips into light of greater wavelength. The white light is, for example, mixed from blue and yellow fractions.

The light-emitting diode chips 2a may in each case comprise a dedicated optical element, which is formed, for example, by a potting body in which the light-emitting diode chips 2a, 2b are embedded.

The light-emitting diode chips 2a, 2b are accommodated on a connection carrier 5 which may take the form of a printed circuit board or metal foil board. The light-emitting diode chips 2a, 2b are arranged in a common mounting plane 12 which is formed, for example, by the mounting side of the connection carrier 5 facing towards the light-emitting diode chips 2a, 2b. The light-emitting diode chips of the light source 1 are point-symmetrical relative to the point of intersection 13 between the longitudinal center axis 11 of the optical element 3 and the mounting plane 12. In other words, the two light-emitting diode chips 2a which emit red light are located on a diagonal which intersects the longitudinal center axis 11.

The optical element 3 is arranged downstream of the light source 1.

The optical element 3 takes the form of a solid body made from a transparent plastics material. The optical element 3 is preferably free of radiation-scattering particles. This means that the optical element 3 is of transparent construction. The optical element 3 comprises a radiation entrance face 31 which faces towards the light source 1. The radiation entrance face 31 is arranged at a distance from the light-emitting diode chips 2a, 2b of the light source 1 such that there is a gap 4, which in the present case is filled with air, between the light source 1 and the optical element 3. The optical element 3 furthermore comprises a circumferential face 32, which is in places the circumferential face of a truncated cone which tapers towards the radiation entrance face 31.

The optical element 3 further comprises a radiation exit face 33. The radiation exit face 33 is divided into two zones 331, 332. In the first zone 331, the radiation exit face 33 is curved convexly outwards. The second zone 332 is of planar construction and encloses the first zone 331 peripherally, wherein the radiation exit face in the first zone 331 projects beyond the radiation exit face in the second zone 332.

The optical element 3 is also divided into two zones: in a first zone 3a, the circumferential face of the optical element 32 is the circumferential face of a truncated cone. With the exception of the recess 6 on the radiation entrance face 33, the optical element 3 takes the form of a truncated cone in the first zone 3a. In the second zone 3b of the optical element, the optical element is outwardly curved in the manner of a dome.

In the first zone 3a of the optical element 3, the optical element 3 comprises a recess 6 which is in the form of a cylinder or truncated cone. If the recess 6 is in the form of a truncated cone, the truncated cone tapers from the radiation entrance face 31 towards the radiation exit face 33. The recess 6 is in any event of rotationally symmetrical construction, wherein the axis of rotation coincides with the longitudinal center axis 11 of the optical element. The longitudinal center axis 11 intersects the light source 1 at the point of intersection 13. The geometric center of gravity of the light source 1 is preferably also located on the longitudinal center axis 11.

The mode of operation of the lighting device when in operation may be described as follows: the light 22a, 22b emitted by the light-emitting diode chips 2a, 2b when in operation impinges on the radiation entrance face 31, where it is refracted due to the refractive index difference. Some beams are here directly guided to the radiation exit face 33 and leave the optical element 3 without impinging on the circumferential face 32 in the zone 3a of the optical element. This applies in particular to beams which enter the optical element 3 in the zone of the bottom face 6a of the recess 6.

Beams of light which enter the optical element 3 in the zone of the side face 6b of the recess 6 are guided in the direction of the circumferential face 32 in the zone 3a and are there totally reflected preferably exactly once, before they leave the optical element 3 through the radiation exit face 33, for example, in the second zone 332.

Overall, at its radiation exit face 33, the optical element 3 has a non-uniform distribution of the light of different colors. However, due to the rotational symmetry of the optical element 3 and the arrangement of the light-emitting diode chips 2 of the light source 1, in the far field, i.e., at a distance of, for example, at least 10 cm, for example, of 1 m, particularly uniform color mixing takes place.

The beams of light 22a, 22b are in particular not already diffusely scattered on entering the optical element, for example, by a roughened portion, and intermixed in this manner, but instead the light of different colors may pass mutually independently through the optical element on separate paths.

In particular in the zone of the side faces 6b of the recess, the radiation entrance face 31 is of smooth construction, such that a defined refraction of the beams of light 22a, 22b in the direction of the circumferential face 32 and then a defined reflection in the direction of the radiation exit face 33 is obtained.

Figure 2B:
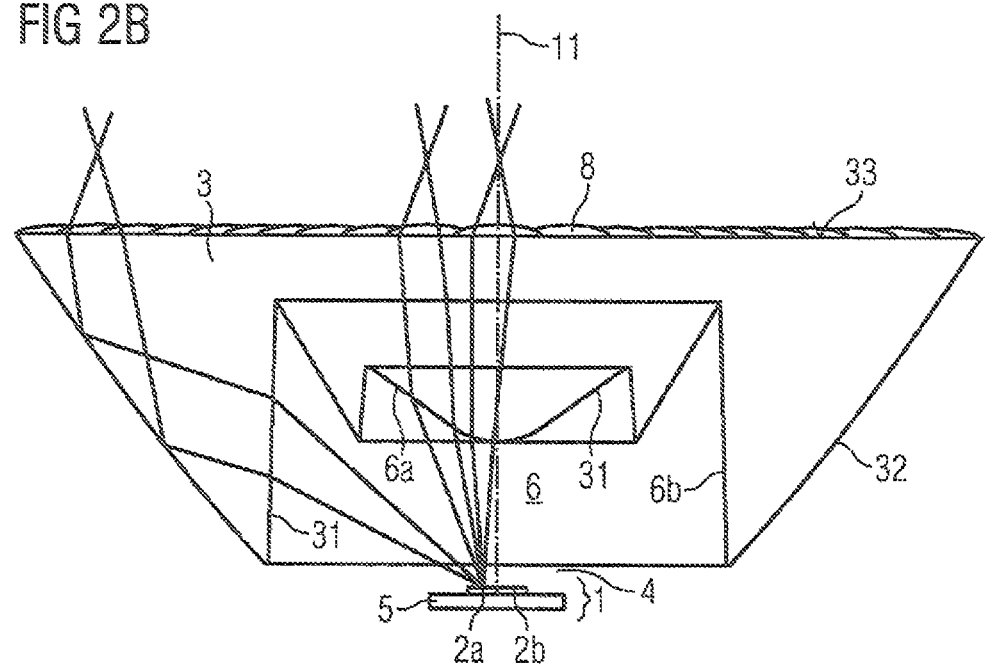

A further example of a lighting device described herein is explained in greater detail in conjunction with FIGS. 2A, 2B. At variance with the example of FIGS. 1A, 1B, the light source 1 comprises four light-emitting diode chips. For example, the light source may comprise two green light-emitting diode chips 2b, one red light-emitting diode chip 2a and one blue light-emitting diode chip (not shown).

Furthermore, at variance with the example of FIGS. 1A, 1B, the bottom face 6a of the recess 6 is not of smooth construction, but instead convexly and concavely curved in places. The recess is in turn rotationally symmetrical relative to the longitudinal center axis 11 of the optical element.

The optical element 3 comprises patterning 8 on its radiation exit face 33. The patterning 8 takes the form of elliptical lenses, which project convexly out from the optical element 3 and are formed, for example, from the material of the optical element 3. The elliptical lenses are arranged in concentric circles around the point of intersection of the longitudinal center axis 11 of the optical element with the radiation exit face 33, wherein the main direction of extension of the elliptical lenses is oriented in the direction of this point of intersection.

The configuration of the radiation entrance face 31 and of the radiation exit face 33 of the optical element 3 results in particularly uniform light mixing of the individual colors of the light-emitting diode chips 2a, 2b in the far field.

In the lighting devices of FIGS. 1 and 2, the problem may now arise that, from a few specific directions of view onto the optical element 3, certain light-emitting diode chips 2a, 2b may be seen in magnified form and thus poorer color mixing is obtained at specific points in the far field. The optical elements 3 described in conjunction with FIGS. 3A, 3B and 4 for a lighting device described herein solve this problem too.

Figure 3A:
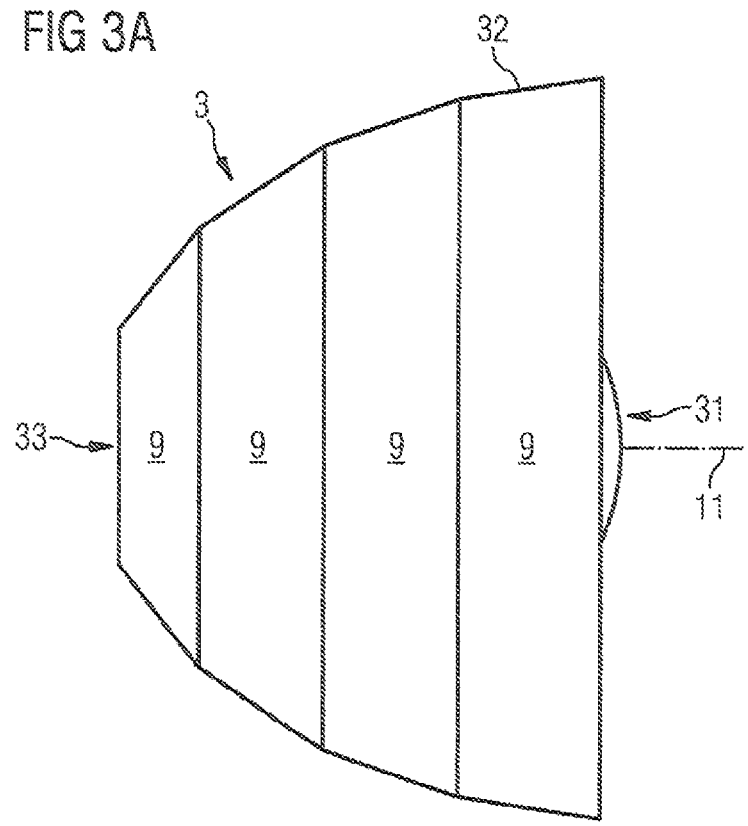

In the case of the optical element 3 described in conjunction with FIGS. 3A and 3B, the circumferential face 32 of the optical element is formed by truncated cones 9 with a different opening angle. The longitudinal center axes of the truncated cones 9 coincide with the longitudinal center axis 11 of the optical element 3. The smaller is the opening angle of a truncated cone 9, the closer is it arranged to the radiation exit face 33. The optical element comprises, for example, at least two, in particular at least three truncated cones 9 of differing size and at most ten truncated cones 9 of differing size. The truncated cones 9 approximate to a larger truncated cone. In other words, the circumferential face 32 is formed by rotationally symmetrical facets.

The optical element may comprise an indentation 7 on the radiation exit face 33, there being formed a first zone 331, which is curved convexly outwards, of the radiation exit face 33. The indentation 7 is not arranged in a second zone 332 of the radiation exit face 33. This second zone 332 projects beyond the first zone 331 and encloses it in the manner of a frame.

An optical element for a lighting device described herein is explained in greater detail in conjunction with FIG. 4, in which optical element the circumferential face 32 is formed at least in places by non-rotationally symmetrical facets, for example, by planar faces 10. The planar faces 10 approximate to the circumferential face of a truncated cone. The truncated cone is, for example, approximated by means of at least 40 planar faces 10 and at most 500 planar faces 10. The optical element 3 in turn comprises an indentation 7, in which is arranged a first zone 331 of the radiation exit face 33, a second zone 332 projecting beyond and laterally enclosing the first zone 331.

Figure 5:
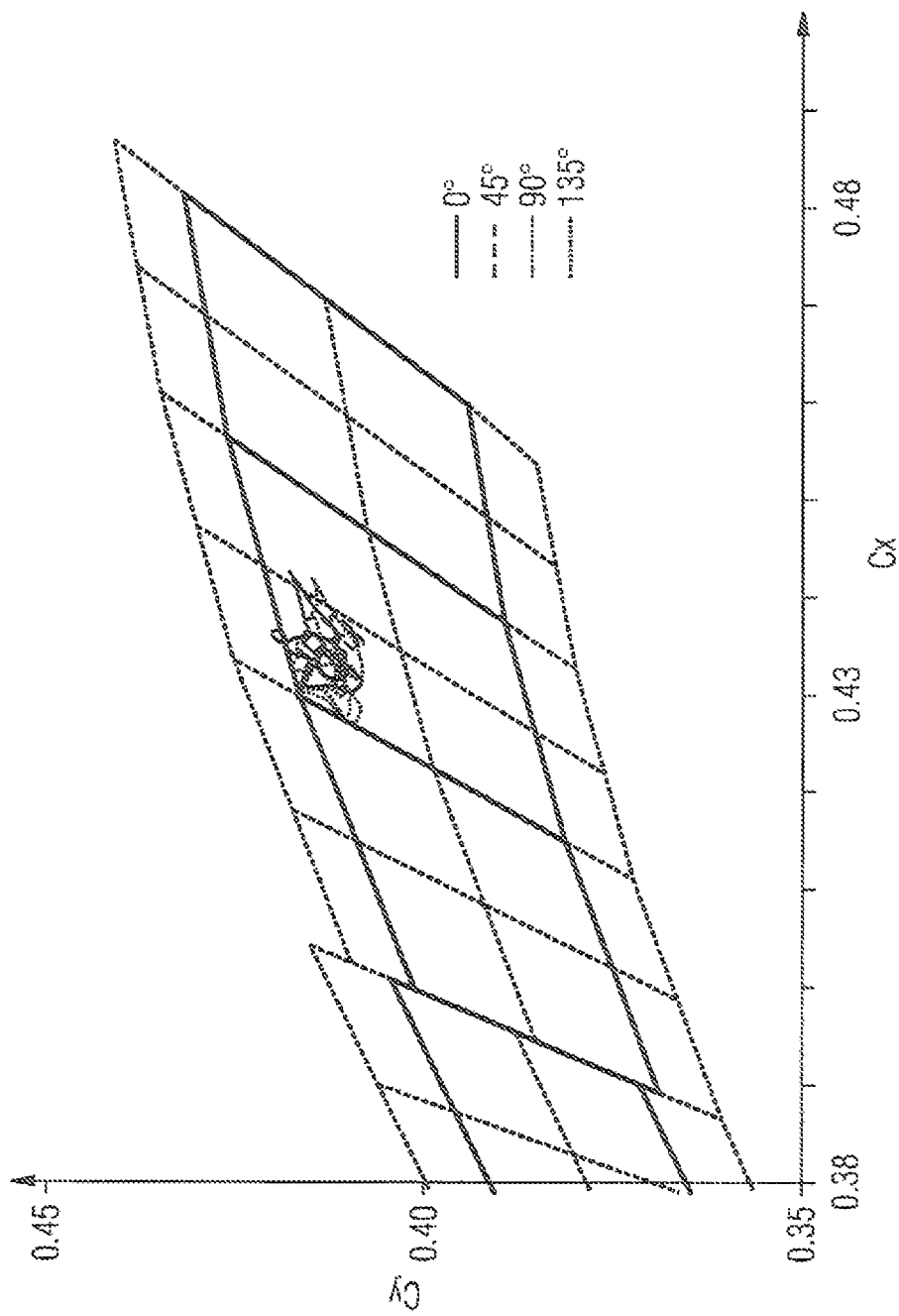
FIGS. 5, 6A and 6B explain the optical properties of the lighting devices described herein in greater detail.
Figure 6A:
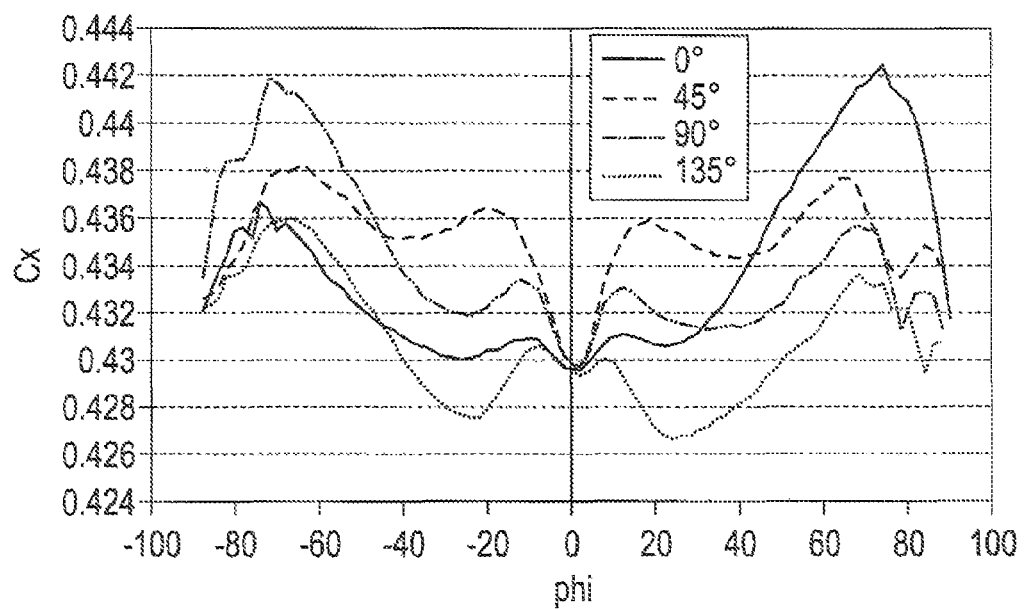
Figure 6B:
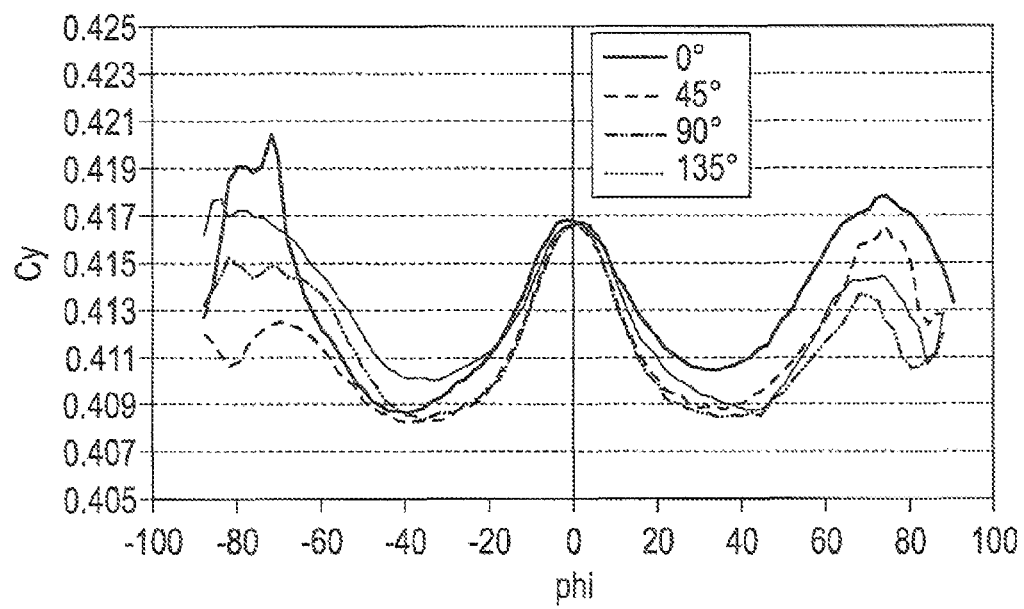

The color mixing for a lighting device described herein is explained in conjunction with graph plots shown in FIGS. 5, 6A and 6B. FIG. 5 shows the color location of the mixed light, for example, composed of the beams of light 22a and 22b, for four different angles of intersection in the far field. As is apparent from FIG. 5, the color location for all the angles is within a single ANSI box, such that no color non-uniformity is discernible by a human observer.

FIGS. 6A and 6B respectively plot the CX and CY coordinates of the color locations for the four different angles of intersection for a hemisphere around the lighting device. It is also apparent from FIG. 6 that the uniform color mixing is almost angle-independent.

The description made with reference to examples does not restrict this disclosure to these examples. Rather, the disclosure encompasses any novel feature and any combination of features, including in particular any combination of features in the appended claims, even if the feature or combination is not itself explicitly indicated in the claims or examples. For example, the optical element described herein itself constitutes inventive subject matter and may also be claimed independently of the lighting device.

The invention claimed is:

1. A lighting device comprising:
a light source comprising at least two light-emitting diode chips which emit light of mutually differing colors when in operation, and
an optical element in the form of a solid body made from a dielectric material comprising:
a radiation entrance face facing towards the light-emitting diode chips,
a radiation exit face remote from the light-emitting diode chips, and
a circumferential face connecting the radiation entrance face and the radiation exit face to one another,
wherein
the circumferential face is reflective to the light emitted by the light-emitting diode chips when in operation, and
the radiation entrance face and/or the radiation exit face is/are non-planar at least in places,
a gap, which is filled with a gas, is arranged between at least one of the light-emitting diode chips of the light source and the radiation entrance face and is in direct contact with the radiation exit face of the light-emitting diode chips,
the optical element is a sole optical element of the lighting device, which optical element is arranged downstream of all light-emitting diode chips of the light source, and
a dedicated light path is provided in the optical element for each color of the light-emitting diode chips such that the lighting device emits colored light at the radiation exit face of the optical element and uniform white light in the far field.

2. The lighting device according to claim 1, wherein the second zone projects beyond the first zone at least in places.

3. The lighting device according to claim 1, wherein, when the light source is in operation, non-uniformities in color location perceptible to a human observer are present on the radiation exit face of the optical element, and in a far field the color location of an area illuminated with the light from the lighting device appears uniform to an observer.

4. The lighting device according to claim 1, wherein the circumferential face is at least in places the circumferential face of a truncated cone.

5. The lighting device according to claim 1, wherein the light from the light-emitting diode chips is reflected by total reflection at the circumferential face in the direction of the radiation exit face.

6. The lighting device according to claim 1, wherein each beam of light emitted by the light-emitting diode chips is reflected at most once at the circumferential face before it leaves the optical element through the radiation exit face.

7. The lighting device according to claim 1, wherein the optical element is in the form of a truncated cone in places and which comprises a recess on the radiation entrance face side.

8. The lighting device according to claim 7, wherein the recess is cylindrical or in the form of a truncated cone.

9. The lighting device according to claim 1, wherein at least one of a radiation entrance face, a radiation exit face and a circumferential face of the optical element comprises patterning at least in places.

10. The lighting device according to claim 9, wherein the patterning comprises an optical, elliptical lens formed in the face and/or in which the patterning comprises a roughened portion.

11. The lighting device according to claim 1, wherein the radiation entrance face is at least partly smooth.

12. The lighting device according to claim 1, wherein the circumferential face is composed at least in places of the circumferential faces of at least two truncated cones which differ with regard to their opening angle.

13. The lighting device according to claim 1, wherein the circumferential face is composed at least in places of planar faces which at least approximate a truncated cone.

14. The lighting device according to claim 1, wherein
the light-emitting diode chips of the light source are arranged in a common mounting plane,
the optical element is rotationally symmetrical with regard to the longitudinal center axis of the optical element, and
identically colored light-emitting diode chips of the light source are arranged point-symmetrically with regard to a point of intersection of the longitudinal center axis of the optical element and the mounting plane.

15. The lighting device according to claim 1, wherein the circumferential face is composed at least in places of circumferential faces of at least two truncated cones having different opening angle, longitudinal center axes of the at least two truncated cones coincide with a longitudinal center axis the optical element, and an opening angle of a truncated cone of said at least two truncated cones decreases, the closer the truncated cone is arranged to the radiation exit face of the optical element.

16. The lighting device according to claim 1, wherein the circumferential face completely consists of a plurality of planar faces which together approximate a truncated cone.

17. A lighting device comprising:
a light source comprising at least two light-emitting diode chips which emit light of mutually differing colors when in operation, and
an optical element in the form of a solid body made from a dielectric material comprising:
a radiation entrance face facing the light-emitting diode chips,
a radiation exit face remote from the light-emitting diode chips, and
a circumferential face connecting the radiation entrance face and the radiation exit face to one another,
wherein
the circumferential face is reflective to the light emitted by the light-emitting diode chips when in operation,
the radiation entrance face and/or the radiation exit face is/are non-planar at least in places,
a gap, which is filled with a gas, is arranged between at least one of the light-emitting diode chips of the light source and the radiation entrance face and is in direct contact with the radiation exit face of the light-emitting diode chips,
the optical element comprises an indentation on the radiation exit face side, the optical element comprises in the indentation a convexly outwardly curved first zone laterally surrounded at least in places by a second zone of the optical element,
the circumferential face is composed at least in places of the circumferential faces of at least three truncated cones which differ with regard to their opening angle or the circumferential face is composed at least in places of planar faces which at least approximate to a truncated cone, and
the optical element is a sole optical element of the lighting device, which optical element is arranged downstream of all the light-emitting diode chips of the light source.

* * * * *